US006639541B1

(12) United States Patent
Quintana et al.

(10) Patent No.: US 6,639,541 B1
(45) Date of Patent: Oct. 28, 2003

(54) DEVICE AND METHOD FOR DETECTING, MEASURING, AND REPORTING LOW-LEVEL INTERFERENCE AT A RECEIVER

(75) Inventors: Alvin L. Quintana, Ridgecrest, CA (US); Mark P. Egan, Inyokern, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 529 days.

(21) Appl. No.: 09/652,112

(22) Filed: Aug. 29, 2000

(51) Int. Cl.[7] .................. H04B 17/00; H04B 7/185; G01S 7/36; H04K 3/00
(52) U.S. Cl. ............ 342/18; 342/18; 342/357.12; 455/67.1
(58) Field of Search ............... 455/67.1, 67.3, 455/67.5, 67.7, 63; 342/357.03, 357.07, 12, 14, 16, 18, 20

(56) References Cited

U.S. PATENT DOCUMENTS

| 4,283,795 A | 8/1981 | Steinberger |
| 4,866,450 A | 9/1989 | Chisholm |
| 4,937,582 A | 6/1990 | Mohuchy |
| 5,268,927 A | 12/1993 | Dimos et al. |
| 5,298,908 A | 3/1994 | Piele |
| 5,311,192 A | 5/1994 | Varga et al. |
| 5,311,194 A | 5/1994 | Brown |
| 5,557,284 A | 9/1996 | Hartman |
| 5,661,491 A * | 8/1997 | Jones ................... 342/418 |
| 5,712,641 A | 1/1998 | Casabona et al. |
| 5,768,319 A | 6/1998 | Durboraw, III |
| 5,786,773 A | 7/1998 | Murphy |
| 5,793,323 A * | 8/1998 | Tsui ....................... 342/13 |
| 5,818,389 A | 10/1998 | Lazar |
| 5,822,429 A | 10/1998 | Casabona et al. |
| 5,872,540 A | 2/1999 | Casabona et al. |
| 5,917,446 A | 6/1999 | Greenspan |
| 5,952,961 A | 9/1999 | Denninger |
| 6,177,902 B1 * | 1/2001 | Huntley et al. .......... 342/20 |
| 6,448,925 B1 * | 9/2002 | Shridhara ........... 342/357.02 |

* cited by examiner

*Primary Examiner*—Vivian Chin
*Assistant Examiner*—Yuwen Pan
(74) *Attorney, Agent, or Firm*—Earl H. Baugher, Jr.; Laura R. Foster

(57) ABSTRACT

An inexpensive, reliable apparatus and method for autonomously monitoring, measuring the incident level, recording, comparing, reporting, and optionally displaying an indication of intentional or unintentional low-power interfering signals or emissions, including naturally occurring emissions and reflections, as received at the input of an operating system. A particular application of this invention is to monitor, measure, record, compare, report and optionally display an indication of low level interference in the L1 and L2 bands of operation of the NAVSTAR Global Positioning System (GPS). The received signals in L1 and L2 bands are compared to a reference received signal in a third band. This comparison provides a sensitive means to detect the presence of an interfering emission or signal in the L1 band or the L2 band via canceling out the variation in the radiometric scene temperature. The reported data are used for dynamic decision making.

16 Claims, 3 Drawing Sheets

DEVICE AND METHOD FOR DETECTING, MEASURING, AND REPORTING LOW-LEVEL INTERFERENCE AT A RECEIVER

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The present invention pertains to a receiver system, in particular, a receiver with associated antenna positioned near a Global Navigation Satellite System (GNSS) receiver's antenna to allow autonomous detection, measurement, reporting and optional display of low-level interference.

BACKGROUND

Signals from Global Navigation Satellite Systems (GNSS), the most generally known being the NAVSTAR Global-Positioning System (GPS), are an important asset to systems in common use today, one example being aircraft navigation and control. Conventionally, GPS and inertial measurement units (IMUs) have been combined to provide more effective navigation with the GPS data used as reference for the IMU. This combination provides a synergistic result in that the effective bandwidth of the system can be optimally reduced, providing improved tracking.

In aircraft navigation, the precision available from GPS may even be exploited for instrument landings. For example, U.S. Pat. No. 5,311,194, Precision Approach and Landing System for Aircraft, issued to Brown, May 10, 1994, uses a pseudolite transmitter to provide three-dimensional position information to an aircraft using GPS in an automatic landing mode.

The aviation industry relies upon numerous navigation aids in order to take off, navigate enroute, and land aircraft safely. Such navigation aids (navaids) include, for example, the instrument landing system (ILS), very high frequency omni-directional range (VOR) system, and the like. The Navstar Global Positioning System (GPS) is accepted as an alternative to traditional navaids.

In a high-density airport environment requiring precision control of high performance aircraft in 3D, numerous single function airport systems have been developed over the years to support air traffic control needs. Precise landing navigation is provided by the Instrument Landing System (ILS), while airside navigation is provided by VOR/DMS, LORAN and NDB's. Air Traffic Control (ATC) surveillance is provided primarily through visual means, airport surface detection radar (ASDE), secondary surveillance radar, parallel runway monitoring radar, and, in some cases, primary radar.

With the advent of new multi-function technologies, less expensive, yet superior, performance is available. GNSS technologies and digital communications, coupled with low cost computers, are able to support ATC at airports of all sizes. Presently only the largest airports can justify the investment in a complement of dedicated single function systems, while a majority of smaller airports provide only part of an automated landing capability, if any.

GPS is well suited for use in global flight operations and flight operations from remote or unprepared airstrips. GPS accuracy is sufficient for all phases of flight, including non-precision approaches. Thus, GPS receivers are embraced by the military and those civilian carriers that require accurate, reliable navigation information in remote locations. GPS alone, however, is not accurate for vertical guidance in precision approach and landings.

A system that provides sufficient accuracy in the vertical dimension to allow precision approaches and landings has been proposed in U.S. Pat. No. 5,952,961, Low Observable Radar Augmented GPS Navigation System, issued to Denninger, Sep. 14, 1999. The GPS receiver determines velocity from measurements of the carrier phase and Doppler frequency. Accuracy of the GPS solution is limited by the errors on the GPS signals and the geometry established by the positions of the satellites relative to the user. Generally, neither the precision nor the coverage of the standard positioning service provided by the 21-satellite constellation meets the requirements for a precision approach and landing system.

Additionally, both Differential GPS (DGPS) and Integrity Beacon Landing System (IBLS) do not function in the event GPS signals are lost, jammed, interfered with, or otherwise unavailable. Both require received GPS signals to provide augmented positioning accuracy. Further, neither adds redundancy to the navigation systems already present onboard an aircraft. DGPS and IBLS augment an existing GPS receiver during the approach and landing phases rather than provide a separate source of navigation information. Thus, use of GPS in providing an ATC function is the only capability that may be universally available.

Because of increased. reliance on GPS, any interference is intolerable in particularly critical applications such as instrument landings. Further, the combination of low GNSS signal power levels, operating frequencies in L band, and use of wide bandwidth noise signals makes location of interference sources difficult. However, the interference source must be located to counter jamming or employ methods to attenuate unintentional interference.

GPS can provide sufficient accuracy to meet precision approach and landing system requirements using the GPS carrier phase data to solve for the aircraft's position. This method is termed "Kinematic GPS" or "Carrier-Ranging." GPS carrier measurements from a ground-based reference receiver and the airborne receiver are processed to solve for the precise relative position of the aircraft with respect to the ground facility. Real-time positioning accuracy of <10 cm possible using kinematic GPS. This is sufficient to meet CAT I (i.e., ≧200 ft visibility), II (i.e., 50–200 ft, typically 100 ft visibility), and III (0–50 ft) precision approach accuracy requirements. However, the GPS satellite constellation does not provide sufficient coverage and redundancy to meet these operational requirements for a precision approach and landing system.

Another solution augments GPS satellite measurements with a range observation from a ground-based transmitter, i.e. a pseudolite. Pseudolites that broadcast a signal at the same frequency (1575.42 MHz) as GPS satellites are proposed so that the aircraft receiver can process this measurement as though it were another satellite. However, a pseudolite with this signal format will act as a jammer to users operating near the transmitter, thereby preventing the receiver from receiving clear signals from the GPS satellites. Thus, interference renders this technique unacceptable for use in a precision approach and landing system. A time-slotted signal structure for a pseudolite addresses the above problem although this pseudolite signal will interfere with satellite signals when used at close range to the receiver.

Moreover, the time-slotted or pulsed signal format does not allow contiguous carrier phase measurements to be made of the pseudolite signal. This means that the pseudolite signal cannot be included in the carrier-ranging navigation solution, and the time slotting also affects the use of the pseudolite signal as a high-rate communications link for differential corrections.

To avoid the possibility of this pseudolite signal jamming the satellite signals, it can be broadcast at a different frequency from that of the GPS satellites. This is the approach described in U.S. Pat. No. 4,866,450, Advanced Instrument Landing System, issued to Chisholm, Sep. 12, 1989, wherein a ranging reference signal, modulated with correction data, is broadcast from a ground-based transmitter synchronized to GPS time. However this signal is time-slotted. Thus, it has the same disadvantages as the pseudolite design described in the SC-104 reference, supra. Another disadvantage of the method described in the '450 patent is that a second receiver is required in the aircraft to process the ground station signals broadcast at the second frequency. The timing and frequency offsets between the GPS and second receiver will introduce a significant offset of range measurements made by the two receivers. Although the additional measurement will improve the solution geometry, the receiver offset will degrade the performance of the differential solution.

The Brown '194 patent addresses the above areas in a GPS precision approach and landing system employing a fixed ground facility and a single satellite navigation receiver on board the aircraft. The fixed ground facility includes a reference receiver that measures differential corrections to the satellite code and carrier measurements and a pseudolite that is employed to transmit these corrections to a broadband GPS receiver on board the aircraft and to provide an additional code and carrier measurement to assist in the navigation solution. The pseudolite signal is broadcast at a frequency offset from the L1 GPS frequency in order to prevent interference with the satellite navigation system. The broadband GPS receiver on board the aircraft is capable of making phase coherent measurements from the GPS satellites, the pseudolite signal, and GLONASS satellites. These phase coherent measurements are combined to form a precise differential carrier ranging (DCR) solution that is used to provide three-dimensional position guidance of the aircraft throughout a precision approach and landing procedure. Other recent patents provide for improved ATC operations an example of which is provided below.

U.S. Pat. No. 5,786,773, Local-Area Augmentation System for Satellite Navigation Precision-Approach System, issued to Murphy, Jul. 28, 1998 describes a system that employs a differential GPS to assist aircraft landing. GPS ground stations, each including at least two GPS receivers and a datalink transmitter, calculate and transmit GPS correction data to an aircraft employing a GPS receiver and a datalink receiver, the latter for receiving GPS correction data and other information from a GPS ground station. The aircraft also carries a data processor for determining a global position of the aircraft as a function of both the aircraft GPS pseudorange data and the GPS correction data. The system minimizes the introduction of non-common errors by the use of double-differencing calculations using multiple combinations of satellite and GPS ground station receivers. The system transmits a digital signature from a GPS ground station to an aircraft to authenticate transmissions to identify possible spoofing. Messages transmitted on a datalink include an almanac message that provides data useful for locating other GPS ground stations and a Notice to Airmen (NOTAM) message that provides satellite status. The airborne datalink receiver autonomously scans available datalink frequencies and time slots. One or more optional pseudolite stations, employing a spread spectrum code sequence, improve accuracy and reliability. Additionally, an ILS glideslope frequency is supplied in the datalink, enabling a hybrid mode that combines a differential GPS determination of horizontal position with an ILS determination of altitude.

The GPS signal spectrum uses two L-band frequencies, L1 at 1575.42 MHz and L2 at 1227.60 MHz, with bandwidths of either 2.05 MHz for C/A code or 20.46 MHz for P (Y) code. Each satellite transmits data that provides precise knowledge of the satellite position permitting measurement of the distance from that satellite to the user's receiver. The key to achieving precise navigational performance is the processing of a very weak GPS spread spectrum signal which carries coarse acquisition. (C/A) and precision (P) digitally coded and encrypted data, typically the signal levels are −120 dBm to −136 dBm (isotropic). With this information from at least four GPS satellites, the user can compute four key parameters by solving four independent equations, i.e., the user's location in 3 physical coordinates (x, y, and z) and time, thus providing the user its own position, velocity and time (PVT) through known triangulation techniques.

In general, two signals are needed to eliminate error that arises due to refraction of the transmitted signal by the ionosphere. The L1 signal is Binary Phase Shift Keying (BPSK) modulated by two pseudorandom codes in phase quadrature. Phase code modulation is ideally suited to measuring time or time delay. The time delay correlates to a measure of range while the difference in phase measurements taken at fixed time intervals correlates to a measure of frequency. The phase code modulation is compared (correlated) with the expected phase or replica of the phase code modulation. Typical phase code modulations include both BPSK and Binary Frequency-Shift Keying (BFSK).

A pseudorandom code sequence is a series of numbers that are random in the sense that knowledge of which numbers have been already received does not provide assistance in predicting the next received number. Further, using a binary pseudorandom code to modulate the phase of a carrier signal produces a suppressed carrier spread spectrum signal. The L2 signal is BPSK modulated by only one of the pseudorandom codes. The pseudorandom codes permit simultaneous use of a number of GPS satellite signals to provide dynamic position information. A signal transmitted by a particular GPS satellite is acquired by generating and correlating the pseudorandom code for that satellite. Some of the pseudorandom codes are known and are generated or stored in commercially available GPS receivers. Other pseudorandom codes are not publicly known.

In addition to the U.S. GPS satellites, the former USSR launched a similar satellite positioning system termed GLONASS. The GLONASS device has L1 carrier frequencies assigned between 1602 and 1616 MHz. The state of repair of this system is currently poor and the system may cease to exist in the near future.

Unlike GPS, where each satellite transmits a unique PRN code pair (C/A- and P-code) on the same frequency in a CDMA format, each GLONASS transmits the PRN code pair at a different frequency. The process is represented as frequency division multiple access (FDMA) in contrast to the CDMA used with GPS. Thus, a GLONASS receiver tunes to a particular satellite and demonstrates some degree of inherent interference rejection using its frequency-based options. A narrow-band interference source that may disrupt one GLONASS FDMA signal would disrupt all GPS CDMA signals simultaneously. Using a GLONASS receiver also eliminates the need to consider the interference effect between multiple signal codes (cross-correlation), given the interference is unswept narrow-band interference.

Global Positioning Satellite (GPS) systems, considered to be line-of-sight systems, are subject to multipath effects so that the receiver processes signals received over a multiplicity of different paths. The multiplicity of received signals results from additional signal paths that include reflections. When the signal path from the transmitter to receiver includes a reflection, this particular signal path is longer than a direct path. Multipath signals present a problem because in systems measuring the time of arrival of the signal the time depends on the length of the resultant signal path.

The GPS digital data can be detected and processed even if RF carrier reception is prevented by interference, but high accuracy is attained when the signal carrier is available. This is generally possible because the GPS concept has a high inherent antijam (AJ) capability, however the low received signal level makes GPS vulnerable to low power interference, spoofing, or intentional jamming. It is relatively easy for a local in-band source to overwhelm the GPS signal, preventing successful processing of the digital data. Thus, the GPS system has several identified vulnerabilities to interference. It is important to establish an adequate countermeasure capability for GPS systems to ensure its availability in all scenarios. This was recognized by the military and resulted in the development of several spatial nulling antenna and digital filtering concepts.

U.S. Pat. No. 5,818,389, Method for Detecting and Locating Sources of Common Signal Interference Employing both a Directional and an Omni Antenna, issued to Lazar, Oct. 6, 1998, details how to locate interference sources. GPS receivers are susceptible to passive interference, that is, interference created by signals intended for other purposes. They are also susceptible to intentional jamming. Interfering sources cause dynamic spatial outage volumes so that GPS reception is improbable at various times. Some sources of GPS interference have been identified only after lengthy trial and error measurement by flight equipment and exhaustive investigative reporting inquiries. A conventional method to improve reception in the present of interference is adding receive-antenna beam steering to avoid the interference.

Current investigative methods for the detection of interfering sources include:

volume mapping of GPS outages, and measurement of localized electromagnetic power spectral densities, with corresponding verbal and written inquiries into what might be possible causes.

Typically, interference detection systems are limited to spectrum analysis of all received signals, without a means to determine if the received signals do cause actual interference and block reception.

A GPS outage suspected to be due to interference may be due to other factors such as:

physical blockage;

large initial position or time errors that can preclude initial acquisition;

loss of receiver memory that can preclude initial acquisition;

operator error that can preclude initial acquisition; and failure in the satellite control system.

During an outage, interference detection is difficult because GPS receivers can not indicate the presence of interference when they are unable to track GPS satellites. Likewise, when the GPS signal is always received, it is presumed that no interference is present, because the interference signal is not strong enough to alert users of interference. It is only when the GPS interference is sufficient to cause intermittent GPS reception outages, yet insufficient to cause a total GPS reception outage, that GPS interference is detected. That is, intermittent GPS reception indicates both the presence of a GPS signal and the presence of a GPS interfering source. Only then may GPS interference be presumed and interference detection methods employed.

GPS receiver interference includes many types:

in-Band interference caused by a direct in-band microwave signal within the pass band of the GPS receiver;

harmonic interference caused by a frequency multiple of the UHF or lower frequency of a transmitted signal;

spillover interference caused by a strong signal having a frequency near the GPS carrier frequency;

intermodulation interference caused by the algebraic combination of two signals that falls within the GPS receiver pass band; and saturation interference caused by a sufficiently strong signal at any frequency that overdrives a low noise amplifier or a limiter device at the input.

The diversity of possible sources of interference increases the difficulty in determining causes of GPS outages.

There are additional difficulties in isolating causes for loss of GPS reception. The inherently weak GPS signal may be typically at −160 dBW at the receiver and consequently a weak interference signal can interfere with GPS reception. A clear line of sight between moving GPS navigation receivers and orbiting GPS satellites may be difficult to maintain at all times. An interfering signal may be strong enough to sufficiently block GPS reception yet be too weak to measure with a spectrum analyzer. In addition, diverse signals from various sources from differing directions may be detected at a GPS receiver sight, yet only one may be a source of interference. One problem associated with multiple potential sources is a determination of which one is the instantaneous cause of GPS interference.

GPS and GLONASS receivers exhibit different levels of vulnerability to interference and jamming emitter waveform types, including: broadband Gaussian noise, continuous wave (CW), swept CW, pulsed CW, amplitude modulated (AM) CW, phase shift keying (PSK) pseudo noise, narrowband and wide-band frequency modulated (FM) signals, etc. Vulnerability depends on the scenario and receiver mode. Broadband Gaussian noise is the most critical interference type in the above group because of the difficulty in filtering broadband noise without concurrent loss of GPS or GLONASS signal level and the intrinsic detrimental cost/performance impact associated with spatial filtering, e.g., null steering solutions on a moving platform.

GPS signals may be received in the presence of a CW jamming signal. Depending upon the ratio of the power in the desired signal to the power in the jamming signal and the jamming tolerance of the signal receiver, the CW jamming signal may degrade the performance of the receiver or even make it inoperable. The term "CW" is used for describing a continuous wave, i.e., not pulsed, jamming signal whose modulation spectrum is normally much less than the modulation spectrum of the spread spectrum signal and may be "swept" across the entire operating bandwidth at varying rates. An out-of-band CW jamming signal may be effectively eliminated by traditional filtering methods. However, an in-band CW jamming signal is more difficult to eliminate. One of the benefits of spread spectrum signal systems is that an in-band CW jamming signal is spread in frequency by the de-spreading process, thereby attenuating the jamming signal and improving receiver performance. Further improvement is obtained by using multi-bit digitizing of the incoming signal combination. However, multi-bit digitizing inserts complexity whereby a high powered in-band CW jamming signal may still degrade performance by overcoming the de-spreading process. Theoretically, a notch filter having capacitive or inductive filter elements, or both, may be used to attenuate the jamming signal. However, the notch filter may need to be extraordinarily narrow and deep in order to be effective and tunable to the CW jamming signal's instantaneous frequency. Such a notch filter is difficult and expensive to effect.

Accordingly, countermeasures systems are necessary for many applications, with modifications that further reduce bandwidth being the most desirable. The standard performance metrics for GPS anti-jamming conditions are receiver threshold jamming-to-signal level (J/S) and carrier-to-noise density (C/NO). The following problems are associated with traditional solutions to GPS jamming:

Under jamming conditions (with low C/NO), narrow tracking loop bandwidths are used, resulting in temporally correlated noise that is sub-optimal for the Kalman filter. Narrow bandwidths also produce a correlation effect between measurements and process noise that tends to destabilize the system.

As jamming power levels increase, the carrier-tracking loop breaks down at a C/NO of about 18 dB-Hz. The loop breaks down because of the SNR into the Costas loop (the product of C/NO and the coherent integration time, i.e., $C/NO \cdot T_i = SNR$) that is the SNR prior to the squaring operation. When this happens, the information lost through conventional non-linear loop error discriminants, the arctan function being an example, becomes prohibitive. The result is virtually no restoring force to any loop perturbation. The accepted way to recover SNR is to integrate over longer periods and use narrow bandwidths, resulting in correlated measurement problems. The loss of carrier loop measurements is key since these measurements provide the most accurate source of information necessary to maintain the Inertial Navigation System (INS) alignment, i.e., keep system errors small.

An approach to reducing tracking loop noise bandwidth in order to navigate during modest amounts of jamming uses IMU inertial aiding techniques of code and carrier tracking loops. If a nulling antenna is not used, tracking loops currently phase lock and code lock to J/S levels of approximately 55 dB and 60 dB, respectively. The outputs of these loops produce range and Δ-range measurements to a Kalman filter, conventionally an 18-state navigation Kalman filter. Above these jamming levels, complete loss of GPS measurements occurs, resulting in the inertial navigation system drifting in a divergent fashion.

A system has been developed for suppressing interference and denial jamming signals in the GPS L1 and L2 frequency bands, as described in U.S. Pat. No. 5,872,540, Digital Interference Suppression for Radio Frequency Interference Cancellation, issued to Casabona et al, Jun. 16, 1999; U.S. Pat. No. 5,822,429, System for Preventing Global Positioning Satellite Signal Reception to Unauthorized Personnel, issued to Casabona et al, Oct. 13, 1998; and U.S. Pat. No. 5,712,641, Interference Cancellation System for Global Positioning Satellite Receivers, issued to Casabona et al, Jan. 27, 1998.

Disclosed in the '540 patent is a digital signal processing system that produces an adaptive cancellation arrangement which nulls out all types of concurrent received interference or jamming signals. It uses a unique adaptive interference suppression technique to convert and digitize the analog input signals, and numerically modulate the data to produce effective cancellation of interference signals by nulling while preserving the multiple underlying spread spectrum signals. It generates digital and analog output signals that attenuate interference. Orthogonal components of the composite received signal are separated by the receive antenna and adjusted in phase and amplitude to optimally cancel interference components. It can be combined with digital adaptive transversal filters used primarily to supplement suppression performance by reducing narrow-band interference. The orthogonal received signal and interference components are combined adaptively to create a null that attenuates interference sources while slightly modifying received GPS signals.

Disclosed in the '641 patent is an adaptive polarization cancellation arrangement that nulls out all types of concurrent interference signals received by a Global Positioning System (GPS) receiver from antenna mainlobe and sidelobe situated sources. The orthogonally polarized components of the composite received signal are separated by the receive antenna arrangement and adjusted in the polarization feed adapter network between the antenna and GPS receiver to optimally cancel components. The antenna and installation arrangement creates a polarization filter relative to interference sources that changes their apparent polarization orientation and supports adaptive discrimination based on dissimilar polarization characteristics relative to the desired signals. The orthogonal received signal components from the GPS satellite constellation and from interference sources are combined to adaptively create cross-polarization nulls that adequately attenuate interference sources while slightly modifying the GPS received signals. It can also improve GPS signal levels and SNR by polarization optimization or matching in non-interference environments.

A system incorporating the above patents may also employ polarization nulling, utilizing electric field vector cancellation to effect in-band interference suppression for GPS and GLONASS systems. Polarization cancellation also eliminates interference signals in data links and communications channels, and supplements robust radar electronic countermeasures and electronic counter-counter measures. See, U.S. Pat. No. 5,311,192, Polarization ECCM Technique for Radar Systems, issued to Varga et al, May 10, 1994; U.S. Pat. No. 5,298,908 Interference Nulling System for Antennas, issued to Piele, Mar. 29, 1994; U.S. Pat. No. 4,937,582 Polarization Adaptive Active Aperture System, issued to Mohuchy, Jun. 26, 1990; and U.S. Pat. No. 4,283,795, Adaptive Cross-Polarization Interference Cancellation Arrangement, issued to Steinberger, Aug. 11, 1981.

The implementation of polarization in GPS systems, as described in the '429 and '641 patents, uses a dual polarization antenna, a hardware polarimeter network and a control loop to cross-polarize the antenna network to signals interfering with the composite signals. The implementation of polarization nulling in communications utilizes a tracking channel to track the interfering signal in phase and amplitude and reintroduce this signal in a canceling circuit to cancel the interfering components of the composite received signal.

RF polarimeters are used in instrumentation radars to match antennas, optimize performance, and to measure targets. Reciprocal RF polarimeter devices are used to counter radar jamming as cross-polarization countermeasures. Polarization nulling as used in the '429 and '641 patents for GPS interference suppression applications uses a hardware implementation of the polarimeter structure, composed of separate phase shifters and hybrid junction devices to suppress wide-band and narrow-band interference.

Use of digital adaptive transversal filter nulling for spread spectrum receivers as an approach to cancel narrow-band interference is known. Reference U.S. Pat. No. 5,268,927, Digital Waver Adaptive Transversal Filter for Spread Spectrum Receivers, issued to Dimos et al, Dec. 7, 1993. The generalized implementation digitizes analog input signals consisting of multiple spread-spectrum signals, thermal noise and additive multiple interference, and applies a digital finite impulse response (FIR) filter response to the multi-bit digital representation of the input signals. It then uses a set of variable weight digital coefficients to generate digital output signals that attenuate narrow-band interference. A significant problem is that adaptive transversal filtering is not effective in processing wide-band interference or jamming without disruption of the underlying GPS signals. Adaptive transversal filtering is very effective against continuous-wave (CW) interference and narrow-band interference, such as pulsed CW and swept CW. Polarization nulling, in comparison, is effective against all forms of interference, especially wide-band noise interference.

Another countermeasure is disclosed in U.S. Pat. No. 5,917,446, Radio-Wave Reception System Using Inertial Data in the Receiver Beamforming Operation, issued to Greenspan, Jun. 29, 1999. It employs a receiver with an inertial sensor embedded in an antenna groundplane supporting an array of antenna elements. The beamformer within the receiver determines the beamforming weights by incorporating inertially-generated signals representative of the attitude of the receiver and location data identifying the location of GPS satellites. As the host platform moves, the beamformer generates the appropriate gain pattern based on the inertial data of the current attitude and the GPS location data. The beamformer, in particular, performs a spatial filtering function that is characterized by high-gain profiles in the direction of transmission of selected ones of the GPS terminals, thereby effectively suppressing signals originating from jammers and other sources of radio frequency interference (RFI) not associated with GPS satellite positions.

One method of combating interference is to detect interference early, either by identifying an increase in signal levels or higher levels of noise on received signals. A second method is to detect inconsistencies in GPS signals for the case in which signals from more than four satellites are received. This second method is based upon the pseudorange measurement that is fundamental to GPS operation. When signals are received from more than four satellites, more measurements are made than are required to determine position. These additional calculations are used to determine if any signals are corrupted. If the measurements are not consistent, interference is present in at least some signals. Since GPS receivers can track up to eight satellites simultaneously, this approach is practical.

A desired GPS signal is extracted from noise through a sequence of filtering at lower and lower frequencies, i.e., low-pass filters. However, the navigation data occurring at a 50-Hz data rate must be decoded from the GPS signal. This data rate sets a lower frequency limit for filtering of interference and limits noise suppression to the ratio of chipping rate to data rate, typically 53.1 dB for the Y-coded signal. If the interference level at the receiver antenna is 53.1 dB or more above GPS signal level, the two are equal at data bit detection. Thus, for a low probability of bit error in the message, noise-to-signal (N/S) or jammer-to-signal (J/S) ratio must be significantly less than 53.1 dB.

For tracking the GPS signal in noisy conditions, the frequency tracking method can be used to achieve a reduced tracking bandwidth that is lower than the frequency limit set by the data rate. This method relies on measurement of phase difference over a sampling interval that is short relative to the data bit. By cumulating (integrating) these phase differences over a much longer interval, for example, 1 second, an average indication of phase difference can be used to reset a Numerically Controlled Oscillator (NCO) frequency to null the average phase difference measured over the averaging period. U.S. Pat. No. 5,768,319, GPS Data Collection in High Noise-to-Signal Ratio Environments, issued to Durboraw, Jun. 16, 1998, describes such an improvement in GPS signal detection in the presence of high interference levels. In the receiver, data from multiple frames of GPS signals are stacked (cumulated) in a memory. The stacked data are then presented as the intended GPS signal.

Users of GPS systems are particularly concerned about the potential of spoofing. Spoofing is the intentional creation of erroneous GPS-like information signals having carrier characteristics the same as normal GPS signals. Spoofing is a form of jamming, but unlike conventional jamming preventing reception of one radio signal by broadcasting an interfering powerful signal, i.e., spoofing "fools" the receiver by transmitting erroneous information. To prevent jamming or spoofing signals from being accepted as actual GPS satellite signals, GPS satellites are provided with an additional secret pseudorandom code, also referred to as the W-code. The W-code is combined with the known P-code to produce what is referred to as a Y-code when the "anti-spoofing" function is activated. When the anti-spoofing function is de-activated, the Y-code is de-activated and the known P-code is used. Thus, the "secret" Y-code can be activated at will by authorized users, i.e., anti-spoofing allows the GPS system to be used for military or priority projects, such as might be associated with ATC at a busy airport.

To overcome spoofing, techniques have been developed to protect codes from being copied. These techniques are used in special security modules referred to as Selective Availability Anti-Spoofing Modules (SAASM). The SAASM module generates details of the PY-code otherwise not publicly available. However, certain details regarding the PY-code are known. This has led to the design of equivalent, albeit lower accuracy, P-code modules. One problem with high security modules such as the SAASM module and low accuracy P-code modules is power consumption due to extreme signal processing needs.

A first step in combating spoofing is to detect it. One method identifies an overall increase in signal level or higher levels of noise on received signals. A second method identifies inconsistencies in received signals when signals from more than four satellites are being received. This second arrangement is based upon the well-known pseudo-range measurements fundamental to GPS operation. Conventionally, signals from at least four satellites are needed to determine position. When signals are received from more than four GPS satellites, more measurements are made than the minimum required to determine position. These additional calculations may be used to determine whether any measurements are corrupted. If the measurements are not consistent, then spoofing is occurring. Since a typical GPS receiver can track up to eight satellites simultaneously, this approach is well within the scope of available technologies.

An example of spoofing countermeasures is disclosed in U.S. Pat. No. 5,557,284, Spoofing Detection System for a Satellite Positioning System, issued to Hartman, Sep. 17, 1996. A pair of antennas is employed in combination with a GPS receiver for detecting a spoofing signal transmitter. A pointing angle between the antennas and the satellite GPS transmitter is detected. The pointing angle, or alternatively the range difference, is obtained by monitoring the behavior of the PRN code associated with the GPS data carrier or the signal carrier itself. In turn, pseudorange measurements, pseudorange rate measurements, carrier phase measurements, and Doppler count measurements associated with the two antennas are used to obtain a discriminant.

Specifically, a processor analyzes the satellite-specific relative range difference values, or alternatively, "rate of change" measurements of the satellite-specific relative range difference values, associated with one or more satellites. This is then compared to a spoofing detection threshold whereby an indication is provided as to whether or not a GPS receiver system is processing erroneous signals from a spoofing generator.

The ubiquitous nature of GNSS user systems as well as the multitude of potential interference sources require an "interference alert" that is part of the user's GNSS set, yet provides an autonomous identification function. Such an alerting function especially must be available where GNSS is relied upon for time-critical decisions on which lives depend, such as ATC, and should not be constrained to particular expensive and complex installations or require major expensive upgrades to existing systems. In all cases, however, it is essential that a system relying on GPS for precision location and timing should be able to "know" when potentially disabling interference is present, in a means providing both reliable and timely notice. A preferred embodiment of the present invention provides such a capability.

SUMMARY OF THE INVENTION

A preferred embodiment of the present invention provides a method and apparatus to identify signal interference, measure the level of the interference, record interference events, report and display interference events as they happen. A particular example applies to signals from a Global Navigation Satellite System (GNSS), more particularly a Global Positioning System (GPS) or GLONASS system. The measurement is taken near the GNSS receiver's antenna, accomplished without the use of the dedicated GNSS receiver and antenna, thus providing an autonomous monitoring system.

Broadly speaking, a preferred embodiment of the present invention provides a monitoring system that may be associated with an operational system. It monitors sources, of electromagnetic energy, i.e., also referred to as sources of electromagnetic emissions. These emissions may include reflected energy, a common example of which is present in "multi-path" interference. These emissions may be naturally occurring or manmade. Further, these emissions may be present in pre-determined frequency bands and interfere with the operational system. The preferred embodiment then compares the monitored electromagnetic emissions present within the pre-determined bands to a reference from a separate frequency band. It has major subsystems that include:

a receive assembly capable of detecting low levels of electromagnetic energy otherwise attainable only unreliably by using a spectrum analyzer or equivalent capability, an antenna system providing for an input of electromagnetic energy to the receive assembly, and a processor to manipulate signals output from said receive assembly.

The monitoring system detects, classifies, records, compares, reports and optionally displays an interpretation of indications of electromagnetic interference for use in dynamic decision making. A particular embodiment envisions the use of a radiometer as part of the receive assembly.

A preferred method for monitoring sources of unwanted or undesirable electromagnetic energy that may interfere with an operational system is:

receiving indications of electromagnetic energy in a pre-determined frequency band or bands using at least one autonomous antenna;

identifying received electromagnetic energy both desirable and undesirable for use by the operational system within the pre-determined frequency band or bands;

measuring the characteristics of the desirable and undesirable electromagnetic energy;

recording the characteristics of the desirable and undesirable electromagnetic energy;

comparing the characteristics of the desirable and undesirable electromagnetic energy being received by the operational system with a reference signal in a separate frequency band;

reporting selected characteristics of the undesirable electromagnetic energy; and displaying to a decision maker at least one audio, video, or audio-visual indication of the selected characteristics of the undesirable electromagnetic energy in a manner suitable for timely interpretation thereof.

One of the preferred embodiments has the following performance goals: measures L1 and L2 frequency bands of GPS signals concurrently within a pre-selected observation period;

matches the 20 MHz RF bandwidth of the P(Y)-coded signal;

employs a threshold permitting detection of interference levels to −118 dBm within the 20 MHz bandwidth;

records and reports measured power levels for each band at 1 Hz;

measures the following interference waveforms:
  narrow-band such as CW tone or tones, including swept CW
  wide-band (BW≦P(Y)) such as FM
  barrage noise, such as band-limited noise.

This embodiment does not identify the type or spectral location of the interference, rather providing a timely indication that received data may be corrupted so that alternative means for obtaining that required data may be pursued.

The basic approaches for monitoring interference use either:

a non-coherent calibrated energy detector, e.g., a Dicke radiometer; or a coherent approach, based on a correlation receiver, e.g., a GPS receiver front end or a Fast Fourier Transform (FFT) based wide-band receiver.

There are several advantages to the radiometric approach:

detects the full required bandwith regardless of the interference waveform;

permits significant sensitivity detection levels;

employs straightforward implementation; and uses components of modest complexity, cost and speed, e.g., an analog-to-digital (AID) converter and a digital CPU.

For comparison, a coherent system would not be able to accomplish the above without significant complexity and extended observation time.

A preferred embodiment of the present invention provides good calibration and low susceptibility to scenario (scene) variations that are presented to its antenna, implying employment of a robust reference channel. Such a reference channel interrogates the "clear" solid angle of the received spectrum at the antenna, comparing it with the received L1 and L2 spectral space of a GPS signal for example, while still interrogating the same solid angle from which the GNSS signals arrive. This allows operation at a fixed site or on an airborne platform and provides "on the fly" radiometric scene temperature (noise) cancellation.

Advantages of preferred embodiments of the present invention, as compared to alternative more complex systems such as a separate co-located GPS receiver or spectrum analyzer, include permitting:

autonomous indication via an audio signal, a visual display, or both;

ready adaptability to existing installed configurations;

simplified design of alternate configurations;

inexpensive fabrication;

reduced system complexity;

reduced system capital costs;

improved robustness;

low maintenance costs;

increased flexibility;

high reliability; and ready upgradability.

Embodiments of the present invention can be applied to any system that must operate in an undegraded mode for safety, security, health or other high risk reasons. This may include communications, surveillance, navigation, health and safety monitoring, or military systems. The concept provides a solution that costs less and provide more accurate and easily interpreted data for warning and dynamic decision making.

Preferred embodiments are fully disclosed below, albeit without placing limitations thereon.

DETAILED DESCRIPTION

Figure 1:
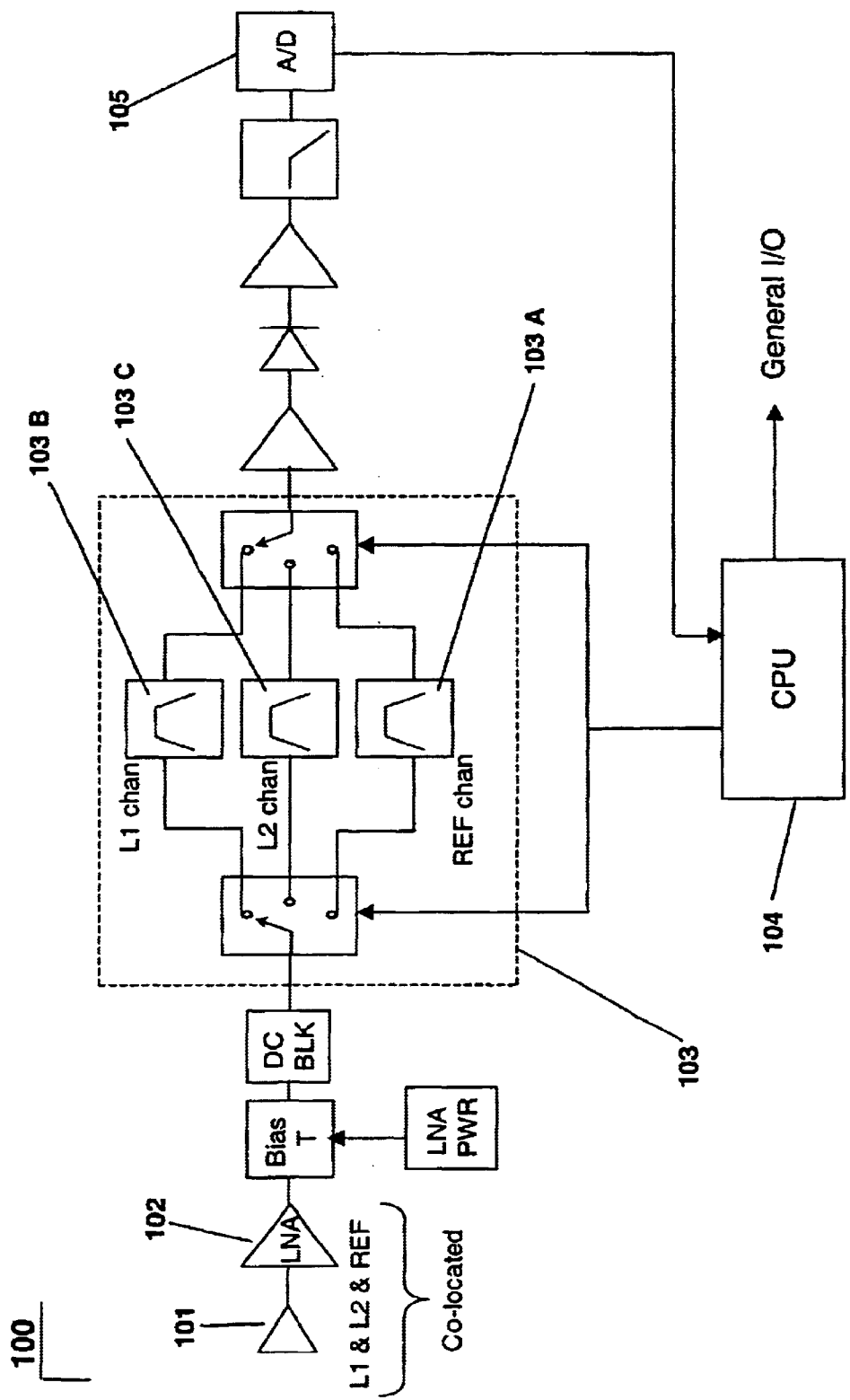
FIG. 1 is a block diagram of a preferred embodiment of the present invention.

Refer to FIG. 1, representing a circuit diagram of a preferred embodiment of the present invention as used to monitor GPS frequencies L1 and L2. The approach is to sample the desired signals on two channels, i.e., L1 chan 103B and L2 chan 103C, and subtract the reference channel, REF chan 103A. Since the reference channel 103A is receiving the same solid angle of antenna coverage from the antenna 101 of the autonomous receiver of a preferred embodiment of the present invention, but operates at different wavelengths, the difference between the two sets of signals (i.e., GPS L1/L2 and reference) provides a measure of externally contributed interference, e.g., noise, spoofing, harmonics of other signals, etc. For an individual channel, e.g., L1 chan 103B, the total amount of time of observation is equivalent to the integration interval of that channel. In general terms, i.e., not considering calibration corrections, for GPS signals L1 and L2, the process is mathematically represented in the following steps:

Take interval data

N samples each of L1, Reference (REF), and L2

Sum the interval data $$L1_{sum} = \sum_{1}^{N} L1, \quad (1a)$$

$$REF_{sum} = \sum_{1}^{N} REF, \text{ and} \quad (1b)$$

$$L2_{sum} = \sum_{1}^{N} L2 \quad (1c)$$

Subtract the Reference interval sum from each of the summed L1 and L2 signals $$L1_{int} = \frac{L1_{sum} - REF_{sum}}{N} \quad (2a)$$

$$L2_{int} = \frac{L2_{sum} - REF_{sum}}{N} \quad (2b)$$

Where: $L1_{int}$ & $L2_{int}$ are the calculated average interval values

Sum up all the intervals $$L1_{total} = \frac{\sum_{1}^{\#int} L1_{int}}{\#int} \quad (3a)$$

$$L2_{total} = \frac{\sum_{1}^{\#int} L2_{int}}{\#int} \quad (3b)$$

Where: $L1_{total}$ & $L2_{total}$ are calculated average values for the report frame, nominally 1 second If time to report a frame, report out (nominally at 1 Hz)

Write $L1_{total}$ and $L2_{total}$ to disk

If NOT time to report a frame

Continue to first step.

A circuit diagram 100 of a preferred embodiment of the present invention is shown in FIG. 1. The radio astronomy band (1400–1427 MHz), allocated as "passive spectrum" by the Federal Communications Commission (FCC), is the reference, REF chan 103A. Use of this band enables a clear spectrum for comparison to the GPS frequencies in the other two channels, L1 chan 103B and L2 chan 103C, for example.

The antenna associated with the autonomous receiver used to interrogate L1, L2, and the reference channel is a broadband antenna 101 polarized to receive GNSS signals optimally. For example, it is right-hand circularly polarized (RHCP) for receiving the GPS L1 and L2 signals. The antenna gain and associated bandwidth accommodates signals on all three channels 103, e.g., L1, L2, and the reference. A Low Noise Amplifier (LNA) 102 is provided with the antenna 101 to minimize system noise temperature and maximize overall sensitivity. To simplify the apparatus, a preferred embodiment of the present invention uses direct RF detection, eliminating the need for a local oscillator (LO).

Figure 2:
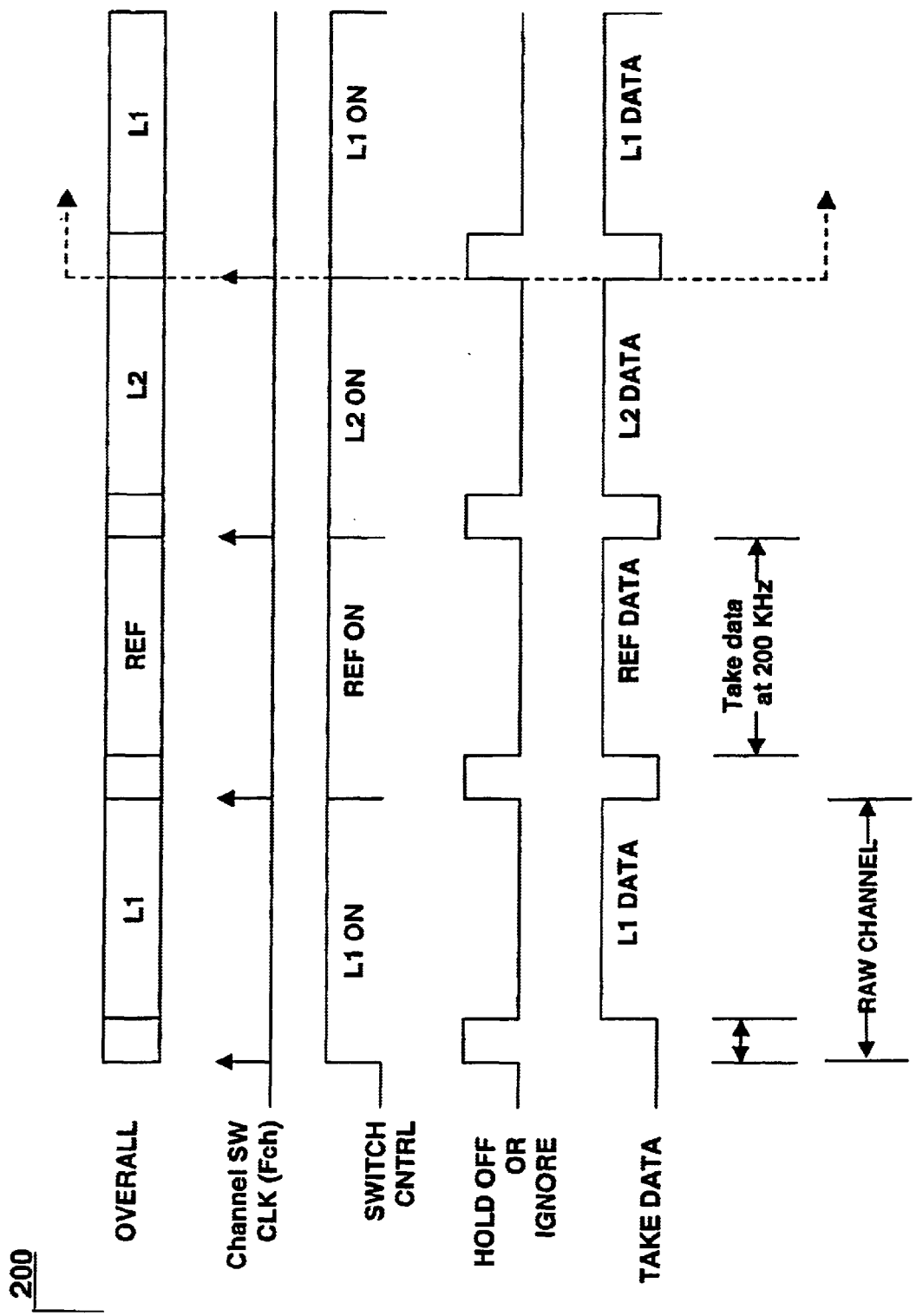
FIG. 2 represents the general channel timing diagram of a preferred embodiment of the present invention.

The timing of the channel switching and sampling has to allow for a settling time i.e., dead time, to allow the anti-alias filter (not separately shown) to ring down. This prevents the leakage of one channel's response into another. The general scheme is provided in the timing diagram of FIG. 2.

The total channel dwell is adjusted via a switch clock (SW CLK) 201 at the channel switching frequency, $F_{ch}$, and a selected total frame time, i.e., a "report out" time. The dwell time sensitivity is able to be adjusted, if necessary. Initially, the system is set up with estimated values. An example of the approach is shown below in Table 1. This setup starts with a value of $F_{ch}$=1 KHz in attempting to set a dwell time of 250 milli-seconds (ms).

Example Timing Parameters

TABLE 1

| T Hold off (kHz) | 25 |
| T stray | 0 |
| A/D Rate (kHz) | 200 |

| Frame time (sec) | Fch Channel switch freq (Hz) | Number of CH inter- vals | Tch Raw CH interval (msec) | Tch Net CH interval (msec) | Net Ch samples | TTL CH Dwell (msec) |
|---|---|---|---|---|---|---|
| 1 | 1000 | 333.33 | 1.00 | 0.75 | 150 | 250 |
| 1 | 500 | 166.67 | 2.00 | 1.75 | 350 | 290 |
| 1 | 250 | 83.33 | 4.00 | 3.75 | 750 | 310 |

Switch control is accomplished as follows. Chopping of the three channels is accomplished via the two single pole three throw switches 103. The logic for the switches 103 is controlled by the PC-104 board CPU 104. This could be controlled also by a microcontroller or a digital signal processor (DSP). The switch logic is asserted low and is TTL compatible. Control of the switches requires 3 bits from the A/D board 105 with the logic shown below in Table 2.

TABLE 2

Switch Control Logic

| L1 | L2 | L3 | L1 Chan (J1) | REF Chan (J2) | L2 Chan (J3) |
|---|---|---|---|---|---|
| 0 | 1 | 1 | ON | — | — |
| 1 | 0 | 1 | — | ON | — |
| 1 | 1 | 0 | — | — | ON |

The input levels are determined as follows. The analog voltage is single-ended, ground referenced, positive, within a range of 10 mV to approximately 7 V. This signal is measured as a ground-referenced signal in a differential manner. This configuration avoids the creation of a ground loop voltage and is accommodated by the 10 V range on the Aim 16-2/PC104 board (not separately shown).

There are three data components: $L1_{raw}$, $L2_{raw}$, and $REF_{raw}$. The "raw" subscript indicates that the difference in gain for the antennas has not been factored into the solution. Thus, there remain two calibration tasks:

remove the offset voltage of each data channel with respect to the reference channel, i.e., a "Zeroing" function; and calibrate the resulting curves with respect to known interference power levels.

This calibration step is necessary to generate a "look-up table" of power vs. voltage. Zeroing allows the use of a single calibration for both curves if they are similar enough in shape, i.e., differing only in offset. For those curves dissimilar in shape, separate look-up tables are needed.

A preferred embodiment of the present invention monitors the GPS frequency bands L1 and L2 for interference, providing quantitative measurements, recording interference incidents, and reporting magnitude as a function of time of arrival. It is intended for use at those signal levels where commercially available equipment, e.g., a spectrum analyzer, would have difficulty processing the signal, i.e., from −118 dBm to −78 dBm. The "working" signal level available from each of the three GPS operational channels varies, with nominal values shown in Table 3. An embodiment of the present invention permits monitoring interference at the nominal N/S (or J/S) ratios shown in Table 4.

TABLE 3

| Signal Level (dB,) Rounded to Nearest dB | | |
|---|---|---|
| L1 C(A) | L1 P(Y) | L2 P(Y) |
| −130 | −133 | −135 |

TABLE 4

| N/S (or J/S) For Signal Levels of Table 3 | | | |
|---|---|---|---|
| Interference (dBm) | L1 C(A) (dB) | L1 P(Y) (dB) | L2 P(Y) (dB) |
| −118 | 12 | 15 | 17 |
| −78 | 52 | 55 | 57 |

Figure 3:
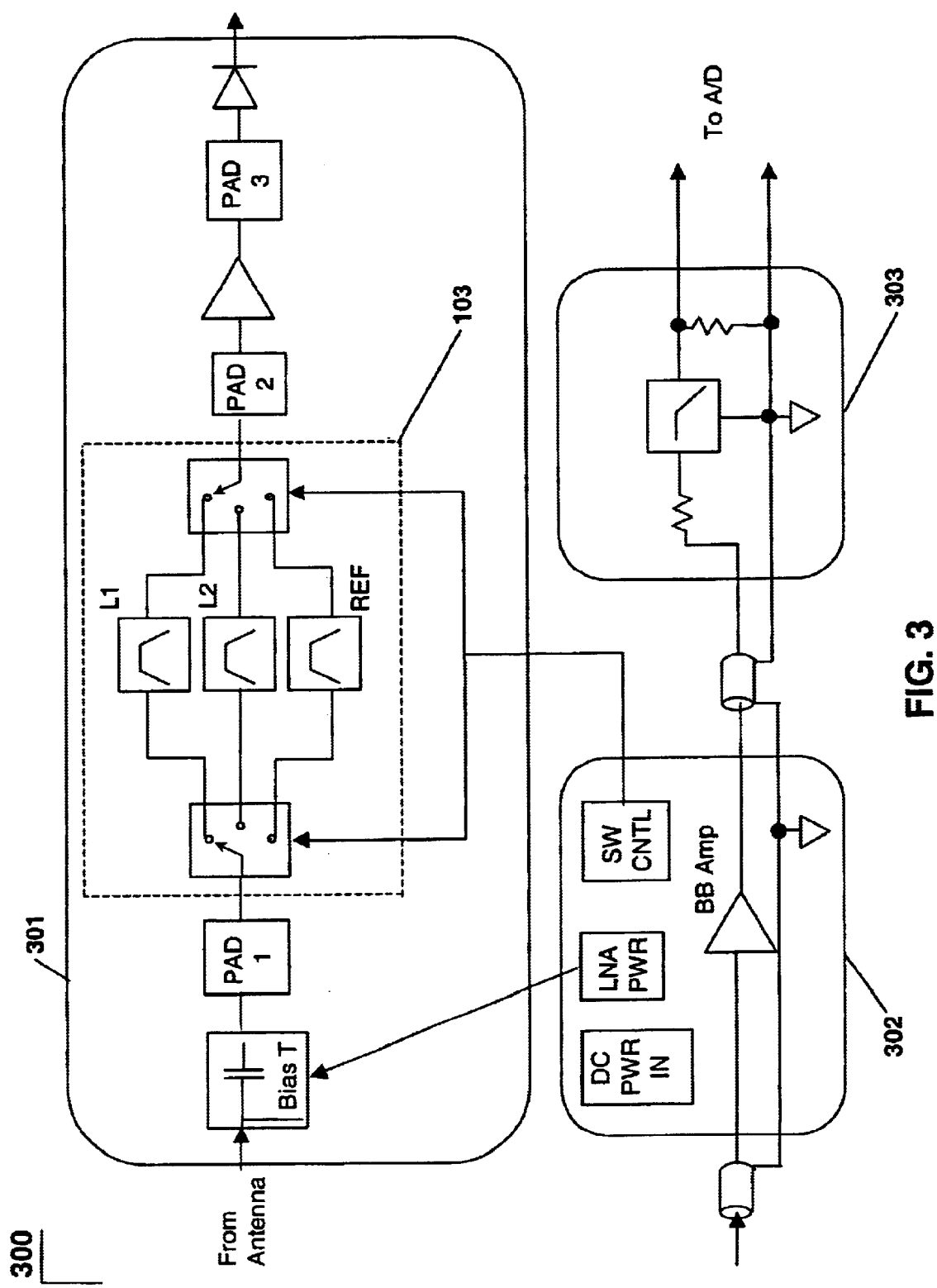
FIG. 3 depicts a representative RF assembly that may be used in a preferred embodiment of the present invention.

FIG. 3 depicts the RF assembly 300 that is used to collect, time, and low-pass filter signals received by the autonomous antenna 101 used as part of a preferred embodiment of the present invention. The switch plate 301 carries out the switching among the three channels, Ref chan 103A, L1 chan 103B, and L2 chan 103C in accordance with timing signals provided by the PC 104 and routed through the Base Band Amplifier (BB Amp) card 302. The resultant signals are then passed through a low pass filter 303, nominally set at 25 KHz, prior to digitizing in the A/D converter 105.

Finally, the indication of interference can be provided as an audio signal, such as a buzzer or bell, a visual display such as a warning light, flashing light-emitting diodes (LEDs), a liquid crystal digital display, or a picture on a CRT of a PC, for example. A preferred embodiment would be a distinctive audio warning in an aircrew's headset coupled with a flashing visual warning on the control panel or in a "heads-up" display focused within an aircrew's normal field of vision so as to appear to be on the aircraft's windshield.

The above descriptions should not be construed as limiting the scope of the invention but as mere illustrations of preferred embodiments. For example, although examples discussed at length the application to GPS, the method and apparatus is applicable to any that a user may need to monitor interference in other bands, such as fax or voice communications, instrument landing system radar, or weapons guidance systems. The scope shall be determined by appended claims as interpreted in light of the above specification.

We claim:

1. A monitoring system that may be associated with an operational system, said monitoring system operating to monitor sources of desirable and undesirable electromagnetic emissions present in a first frequency region containing pre-determined frequency bands in which at least some of the sources may interfere with said operational system that is receiving electromagnetic emissions with specific characteristics in said pre-determined frequency bands, comprising:
 a receive assembly capable of detecting low levels of electromagnetic emissions, said receive assembly having an input and an output;
 an antenna system operably connected to said input of said receive assembly, and
 a processor in operable communication with said output of said receive assembly,
 wherein said monitoring system receives and measures desirable and undesirable electromagnetic emissions in said first frequency region, compares said desirable and undesirable electromagnetic emissions in said first frequency region to a reference in a second frequency region separate from said first frequency region, records the results of said comparison, identifies indications of interference in said pre-determined frequency bands, and reports said indications of interference, said indications otherwise attainable only unreliably by using a spectrum analyzer or equivalent capability.

2. The monitoring system of claim 1 further comprising a display of said reported indications of interference in a manner selected from the group consisting of an audio indication, a visual indication, an audio-visual indication, both a separate audio indication and a separate visual indication, each of said indications within said group being suitable as an input for dynamic decision making.

3. The monitoring system of claim 1 wherein said first frequency region is at least one operating frequency band of a global navigation satellite system (GNSS) and said second frequency region is a frequency band outside of a GNSS operating frequency band.

4. The monitoring system of claim 2 wherein said first frequency region includes L1 and L2 frequency bands of the NAVSTAR Global Positioning System (GPS) and said second frequency region includes the radio astronomy band (1400–1427 MHz), allocated as passive spectrum by the Federal Communications Commission (FCC).

5. The monitoring system of claim 1 wherein said antenna system comprises a right-handed circularly polarized antenna configured to optimize reception in L-band, a low noise preamplifier (LNA) for processing received L-band signals, and a cable suitable for connection to said receiver.

6. The monitoring system of claim 1 wherein said processor comprises a computer that may have removable storage and incorporates a display suitable for interpretation of indications of electromagnetic interference within said first frequency region containing pre-determined frequency bands of operation.

7. The monitoring system of claim 6 wherein said computer is one selected from the group consisting of a microcontroller, a digital signal processor, and a PC.

8. The monitoring system of claim 1 wherein said receive assembly comprises:
 an analog-to-digital (A/D) converter; and
 an RF assembly in operable communication with said A/D converter,
 wherein said receive assembly converts received analog signals to digital for further processing, classification, storage, comparing, reporting, and display in a format suitable for use in dynamic decision making.

9. The monitoring system of claim 8 wherein said RF assembly comprises:
 a filter card in operable communication with said A/D converter;
 a base band amplifier and switch control card in operable communication with said filter card; and
 a switch plate in operable communication with said base band amplifier and switch control card,
 wherein said RF assembly provides for detection and classification of electromagnetic emissions at said antenna, said electromagnetic emissions having at least one L-band component, to a minimum power level of at least −118 dBm over at least 20 MHz of bandwidth.

10. A method for monitoring sources of desirable and undesirable electromagnetic emissions present in pre-determined frequency bands of an operation of an operational system having at least one antenna in which said sources may interfere with said operational system, said operational system operating to receive electromagnetic emissions having specific characteristics in said pre-determined frequency bands, comprising:
 receiving indications of desirable and undesirable electromagnetic emissions within a first frequency region containing said predetermined frequency bands using at least one autonomous antenna suitable for receiving said electromagnetic emissions;
 receiving indications of electromagnetic emissions as a reference signal within a second frequency region outside said first frequency region;
 measuring characteristics of said desirable and undesirable electromagnetic emissions;
 comparing said characteristics of said desirable and undesirable electromagnetic emissions to said reference signal within a second frequency region outside said first frequency region;
 identifying indications of undesirable received electromagnetic emissions within said pre-determined frequency bands;
 recording said characteristics of said undesirable electromagnetic emissions; and
 reporting selected characteristics of said undesirable electromagnetic emissions in a manner suitable for timely interpretation thereof,
 wherein said receiving, measuring, comparing, recording, identifying, and reporting of said characteristics of said undesirable electromagnetic emissions within said pre-determined frequency bands of operation of said operational system is provided as input for dynamic decision making.

11. The method of claim 10 further comprising displaying said reported characteristics of said undesirable electromagnetic emissions in a form selected from the group consisting of an audio indication, a visual indication, an audio-visual indication, both a separate audio indication and a separate visual indication, said indications of said group suitable as an input for dynamic decision making.

12. The method of claim 10 wherein said first frequency region is at least one operating frequency band of a global navigation satellite system (GNSS) and said second frequency region is a frequency band outside of a GNSS operating frequency band.

13. The method of claim 10 wherein said first frequency region includes L1 and L2 frequency bands of the NAVSTAR Global Positioning System (GPS) and said second frequency region includes the radio astronomy band (1400–1427 MHz), allocated as passive spectrum by the Federal Communications Commission (FCC).

14. The method of claim 10 wherein said autonomous antenna comprises a right-handed circularly polarized antenna configured to optimize reception in L-band, a low noise preamplifier (LNA) for processing received L-band signals, and a cable suitable for connection to said receiver.

15. The method of claim 10 wherein said processor comprises a computer that may have removable storage and incorporates a display suitable for interpretation of indications of electromagnetic interference within said predetermined frequency bands of operation of said operational system.

16. The method of claim 15 wherein said computer is one selected from the group consisting of a microcontroller, a digital signal processor, and a PC.

* * * * *